(12) United States Patent
Li (10) Patent No.: US 11,055,190 B1
(45) Date of Patent: Jul. 6, 2021

(54) SYSTEM AND METHOD FOR FACILITATING STORAGE SYSTEM OPERATION WITH GLOBAL MAPPING TO PROVIDE MAINTENANCE WITHOUT A SERVICE INTERRUPT

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 14 days.

(21) Appl. No.: 16/734,111

(22) Filed: Jan. 3, 2020

(51) Int. Cl.
G06F 11/07 (2006.01)
G06F 11/20 (2006.01)
G06F 12/06 (2006.01)

(52) U.S. Cl.
CPC ...... *G06F 11/2094* (2013.01); *G06F 12/0646* (2013.01); *G06F 2201/85* (2013.01); *G06F 2212/1032* (2013.01)

(58) Field of Classification Search
CPC .................................................. G06F 11/2094
USPC .................................................. 714/6.2, 6.32
See application file for complete search history.

(56) References Cited

U.S. PATENT DOCUMENTS

| 10,459,663 B2* | 10/2019 | Agombar | G06F 3/0614 |
| 2009/0307426 A1* | 12/2009 | Galloway | G06F 3/0619 |
| | | | 711/114 |
| 2012/0017037 A1* | 1/2012 | Riddle | G06F 16/25 |
| | | | 711/103 |
| 2016/0077764 A1* | 3/2016 | Oh | G06F 3/067 |
| | | | 709/213 |
| 2017/0185498 A1* | 6/2017 | Gao | G06F 11/0787 |
| 2018/0321864 A1* | 11/2018 | Benisty | G06F 3/0634 |
| 2018/0322024 A1* | 11/2018 | Nagao | G06F 11/1662 |
| 2019/0220392 A1* | 7/2019 | Lin | G06F 12/0246 |
| 2020/0042387 A1* | 2/2020 | Shani | G06F 11/1092 |

* cited by examiner

*Primary Examiner* — Chae M Ko
(74) *Attorney, Agent, or Firm* — Shun Yao; Park, Vaughan, Fleming & Dowler LLP (57) ABSTRACT

The system receives a request to write data with an associated LBA. The system stores, in a global mapping table, a mapping of the LBA to a PBA assigned by a master node. The PBA is associated with a first storage drive in a first collection of storage drives, which includes a first set of storage drives and a plurality of redundant storage drives. The system writes, based on the PBA, the data to the first storage drive. In response to detecting that the first storage drive is defective, the system replaces the first storage drive with a redundant storage drive by reconstructing data stored in the defective storage drive based on a copy of the data. The system thus allows the first collection to remain online while replacing the defective storage drive.

20 Claims, 9 Drawing Sheets

```
                    ┌─────┐
                    │  B  │                                    ← 540
                    └──┬──┘
                       ▼
┌─────────────────────────────────────────────────────────────────┐
│ WHEREIN THE WRITE REQUEST IS RECEIVED BY A DISTRIBUTED SYSTEM    │
│ WHICH COMPRISES THE PLURALITY OF MASTER NODES AND A PLURALITY    │
│ OF COLLECTIONS OF STORAGE DRIVES, INCLUDING THE FIRST COLLECTION │
│ OF STORAGE DRIVES AND A REDUNDANT COLLECTION OF STORAGE DRIVES;  │
│ IN RESPONSE TO DETECTING THAT THE FIRST COLLECTION OF STORAGE    │
│ DRIVES IS DEFECTIVE, REPLACE THE FIRST COLLECTION OF STORAGE     │
│ DRIVES WITH THE REDUNDANT COLLECTION OF STORAGE DRIVES, WHICH    │
│ INVOLVES RECONSTRUCTING DATA STORED IN THE DEFECTIVE COLLECTION  │
│ OF STORAGE DRIVES BASED ON A COPY OF THE DATA STORED IN ANOTHER  │
│ COLLECTION OF STORAGE DRIVES                                     │
│                              542                                 │
└──────────────────────────────┬──────────────────────────────────┘
                               ▼
┌─────────────────────────────────────────────────────────────────┐
│ WHEREIN THE FIRST COLLECTION OF STORAGE DRIVES COMPRISES:        │
│ A BATTERY; THE BATTERY-BACKED VOLATILE MEMORY; A FIRST NIC       │
│ COUPLED TO A FIRST SWITCH AND ASSOCIATED WITH A FIRST VOLATILE   │
│ MEMORY; A SECOND NIC COUPLED TO A SECOND NIC AND ASSOCIATED      │
│ WITH A SECOND VOLATILE MEMORY; THE FIRST SET OF STORAGE DRIVES;  │
│ AND THE PLURALITY OF REDUNDANT DRIVES;                           │
│ IN RESPONSE TO DETECTING AN ERROR ASSOCIATED WITH THE FIRST NIC, │
│ THE FIRST VOLATILE MEMORY, AND THE FIRST SWITCH, ACCESS THE      │
│ STORAGE DRIVES OF THE FIRST COLLECTION VIA THE SECOND NIC, THE   │
│ SECOND VOLATILE MEMORY, AND THE SECOND SWITCH                    │
│                              544                                 │
└──────────────────────────────┬──────────────────────────────────┘
                               ▼
┌─────────────────────────────────────────────────────────────────┐
│ WHEREIN A RESPECTIVE STORAGE DRIVE COMPRISES: A FIRST AND A      │
│ SECOND ECC MODULE; A FIRST AND A SECOND SWITCH; AND A FIRST AND  │
│ A SECOND PLURALITY OF SETS OF FLASH MEMORY; WHEREIN THE FIRST    │
│ ECC MODULE IS COUPLED TO THE FIRST SWITCH AND THE FIRST          │
│ PLURALITY OF SETS OF FLASH MEMORY, AND THE SECOND ECC MODULE IS  │
│ COUPLED TO THE SECOND SWITCH AND THE SECOND PLURALITY OF SETS    │
│ OF FLASH MEMORY;                                                 │
│ ENCODE, BY THE FIRST AND THE SECOND ECC MODULES, BASED ON THE    │
│ ECC, DATA TO BE WRITTEN TO THE FIRST AND THE SECOND PLURALITY    │
│ OF SETS OF FLASH MEMORY                                          │
│                              546                                 │
└──────────────────────────────┬──────────────────────────────────┘
                               ▼
┌─────────────────────────────────────────────────────────────────┐
│ IN RESPONSE TO DETECTING A FAILURE ASSOCIATED WITH ENCODING      │
│ DATA BASED ON THE ECC IN THE FIRST OR THE SECOND ECC MODULE,     │
│ ACCESS THE FIRST OR THE SECOND PLURALITY OF SETS OF FLASH        │
│ MEMORY VIA THE SECOND OR THE FIRST SWITCH                        │
│                              548                                 │
└──────────────────────────────┬──────────────────────────────────┘
                               ▼
                         ┌──────────┐
                         │  RETURN  │
                         └──────────┘
```

SYSTEM AND METHOD FOR FACILITATING STORAGE SYSTEM OPERATION WITH GLOBAL MAPPING TO PROVIDE MAINTENANCE WITHOUT A SERVICE INTERRUPT

BACKGROUND

Field

This disclosure is generally related to the field of data storage. More specifically, this disclosure is related to a system and method for facilitating storage system operation with global mapping to provide maintenance without a service interrupt.

Related Art

Today, various storage systems are being used to store and access the ever-increasing amount of digital content. A storage system can include storage servers with one or more storage devices, and a storage device can include storage media with a non-volatile memory (such as a solid state drive (SSD) or a hard disk drive (HDD)). Current storage systems can include high-density storage equipment, with hundreds of storage drives in a single box (e.g., high-capacity SSDs). Given the high density of these storage drives, hardware failures may inevitably occur. Furthermore, given the ever-increasing amount of data stored by current storage systems, it can be important to maintain the stability of service the overall reliability of a storage system. Thus, handling hardware failures (across the storage system, including all of the storage drives) can result in challenges for deploying and producing the high-capacity storage drives.

SUMMARY

One embodiment provides a system which facilitates operation of a storage system. During operation, the system receives a request to write data, wherein the write request indicates a logical block address associated with the data. The system stores, in a global mapping table maintained by a plurality of master nodes, a mapping of the logical block address to a physical block address assigned by a master node, wherein the physical block address is associated with a non-volatile memory of a first storage drive in a first collection of storage drives, and wherein the first collection of storage drives further includes a first set of storage drives and a plurality of redundant storage drives. The system writes, based on the physical block address, the data to the non-volatile memory of the first storage drive. In response to detecting that the first storage drive is defective, the system replaces the first storage drive with a redundant storage drive by reconstructing data stored in the defective storage drive based on a copy of the data stored in another storage drive. The system thus allows the first collection of storage drives to remain online while replacing the defective storage drive.

In some embodiments, the write request is received by a distributed storage system, which comprises: the plurality of master nodes, wherein a flash translation layer module in each master node maintains and stores the global mapping table; and a plurality of collections of storage drives, including the first collection of storage drives and a redundant collection of storage drives.

In some embodiments, in response to detecting that the first collection of storage drives is defective, the system replaces the first collection of storage drives with the redundant collection of storage drives, which involves reconstructing data stored in the defective collection of storage drives based on a copy of the data stored in another collection of storage drives, thereby allowing data stored in the first collection of storage drives to remain accessible while replacing the first collection of storage drives.

In some embodiments, the first collection of storage drives comprises: a battery; a battery-backed volatile memory, which comprises a first volatile memory and a second volatile memory; a first network interface card (NIC) coupled to a first switch and associated with the first volatile memory; a second NIC coupled to a second switch and associated with the second volatile memory, wherein the first switch and the second switch are coupled to a plurality of expanders; the first set of storage drives, including at least one second storage device coupled to the first or second switch and at least one third storage device coupled to the expanders; and the plurality of redundant storage drives.

In some embodiments: the first switch or the second switch is a Peripheral Component Interconnect Express (PCIe) switch; the expanders are Serial Attached SCSI (SAS) expanders; the second storage device is a PCIe storage device; and the third storage device is an SAS storage device.

In some embodiments, in response to detecting an error associated with the first NIC, the first volatile memory, and the first switch, the system accesses the storage drives of the first collection via the second NIC, the second volatile memory, and the second switch.

In some embodiments, a respective storage drive comprises: a first error correction code (ECC) module and a second ECC module; a first switch and a second switch; and a first plurality of sets of flash memory and a second plurality of sets of flash memory, wherein the first ECC module is coupled to the first switch and the first plurality of sets of flash memory, and wherein the second ECC module is coupled to the second switch and the second plurality of sets of flash memory.

In some embodiments, the system encodes, by the first and the second ECC modules based on the ECC, data to be written to the first and the second plurality of sets of flash memory. In response to detecting a failure associated with encoding data based on the ECC in the first or the second ECC module, the system accesses the first or the second plurality of sets of flash memory via the second or the first switch.

In some embodiments, the first collection of storage drives further includes a battery-backed volatile memory. Prior to writing the data to the non-volatile memory of the first storage drive, the system writes the data to the battery-backed volatile memory. Writing the data to the non-volatile memory of the first storage drive comprises writing, based on the physical address, the data from the battery-backed volatile memory to the non-volatile memory of the first storage drive. In response to detecting a power loss, the system uses the battery of the battery-backed volatile memory to write the data from the battery backed volatile memory to the non-volatile memory of the first storage drive.

In some embodiments, the system receives a request to read the data, wherein the read request indicates the logical block address associated with the data. The system obtains, from the global mapping table, the physical block address corresponding to the logical block address. The system reads, based on the physical block address, the data from the non-volatile memory of the first storage drive.

BRIEF DESCRIPTION OF THE FIGURES

FIG. 5C presents a flowchart illustrating a method for facilitating operation of a storage system, including several redundancy mechanisms, in accordance with an embodiment of the present application.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate a storage system which operates with an improved efficiency by using global mapping to provide maintenance operations without requiring a service interrupt.

As described above, the high-density storage equipment in current storage systems can include hundreds of storage drives in a single box (e.g., high-capacity, high-density SSDs). Given the high density of these storage drives, hardware failures may inevitably occur. Furthermore, given the ever-increasing amount of data stored by current storage systems, it can be important to maintain the stability of service the overall reliability of a storage system. Thus, handling hardware failures (across the storage system, including all of the storage drives) can result in challenges for deploying and producing the high-capacity storage drives.

One current storage system can include two master nodes and multiple just a bunch of disks or drives (JBODs) or just a bunch of flash (JBOF). Each JBOD can include hundreds of storage drives with a PCIe/SAS fabric expansion. Each master can also include a few storage drives. The pair of master nodes can provide high availability for the storage system. However, if a single storage drive (out of hundreds of storage drives) in a JBOD fails, an operator (e.g., a field engineer) must take the JBOD offline, replace the defective storage drive, and then place the JBOD back online. Given the hundreds of storage drives in each JBOD and the non-trivial likelihood of hardware failure, the operator may need to spend a certain amount of time to perform these tasks. During the time that a given JBOD is offline, several Petabytes (PB) of data may not be accessible, which can result in a service interrupt. Such a service interrupt can result in an inefficient storage system, and can also affect the Quality of Service (QoS) and any service level agreements (SLAs). An exemplary current storage system is described below in relation to FIG. 1.

Figure 2:
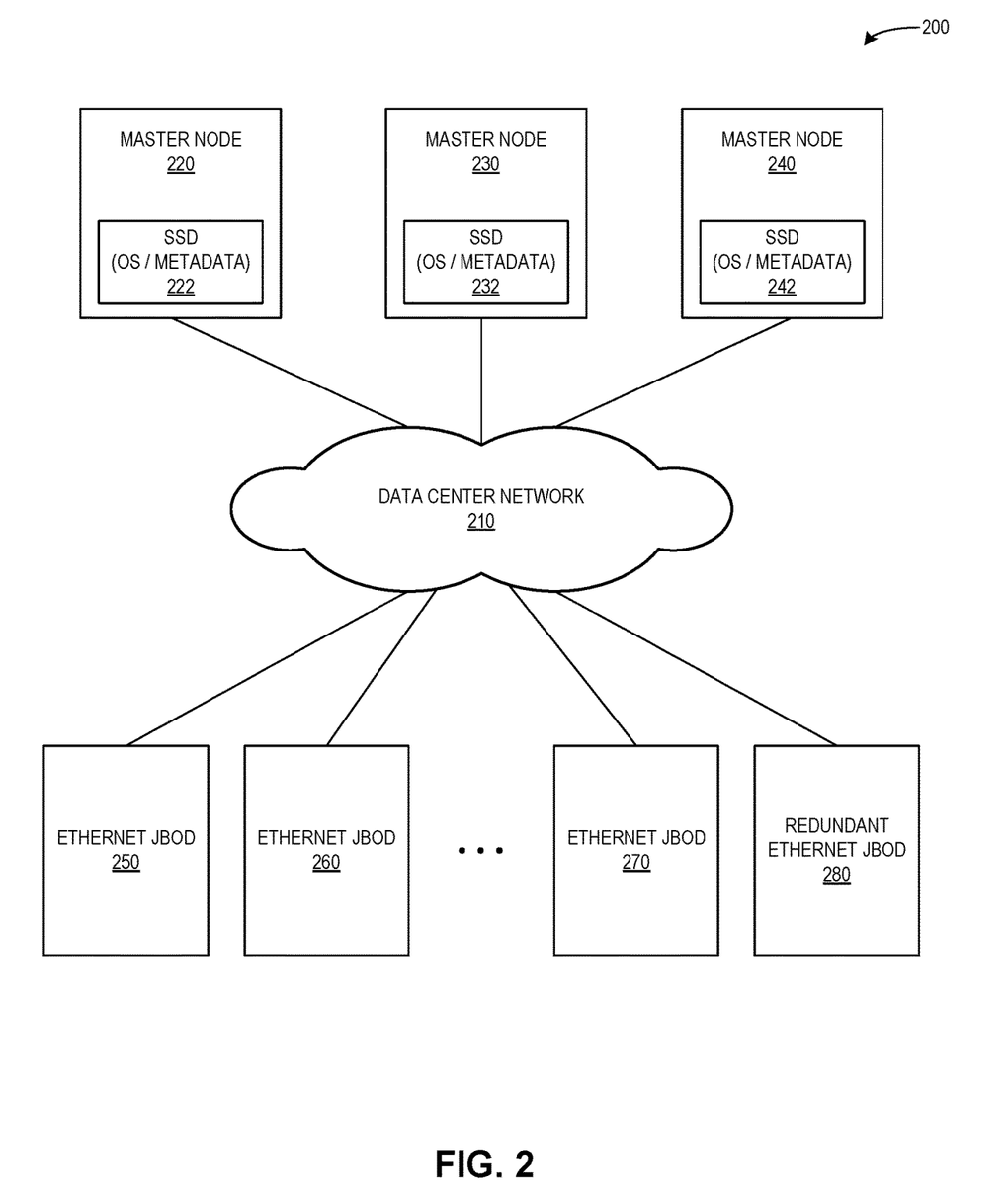
FIG. 2 illustrates an exemplary environment which facilitates operation of a storage system with redundancy, in accordance with an embodiment of the present application.

The embodiments described herein address these challenges by providing a storage system with multiple master nodes, multiple Ethernet JBODs, and at least one redundant Ethernet JBOD, as described below in relation to FIG. 2. Each Ethernet JBOD can include simplified storage devices and redundant simplified storage devices. These simplified storage devices can include physical storage media (such as NAND flash) and an error correction code (ECC) module (e.g., an ECC codec). Each Ethernet JBOD can also include a battery which provides support for a volatile memory (e.g., a DRAM) of an Ethernet JBOD. The battery-backed DRAM can serve as a write cache for the physical storage media of the multiple simplified storage devices of the Ethernet JBOD. An exemplary Ethernet JBOD is described below in relation to FIG. 3.

Furthermore, data stored in a simplified storage device can travel on multiple paths within the simplified storage device. For example, a simplified storage device can include two ECC codecs, which each work on their own group of NAND flash. If one ECC codec fails, the simplified storage device can use the other ECC codec to access the group of NAND flash associated with the failed ECC codec. An exemplary simplified storage device is described below in relation to FIG. 4.

In the embodiments described herein, the simplified storage device can include only the physical storage media and the (pair of) ECC codecs, as well as other components such as switches. Other controller functions (which may typically reside in the storage device) can be implemented by a master node. For example, a master node can include a flash translation layer (FTL) which maintains and stores a global mapping table (e.g., with entries which map logical addresses to physical addresses).

Thus, by offloading the FTL and mapping operations to the master nodes, the embodiments of the system described herein can efficiently use the simplified storage devices of the multiple Ethernet JBODs to provide maintenance without a service interrupt. Furthermore, the system can provide high availability via redundancy at several levels of granularity. The system can use redundant Ethernet JBODs along with a plurality of Ethernet JBODs, where the redundant Ethernet JBODs can provide high availability in the event that a single Ethernet JBOD fails. Each Ethernet JBOD can include multiple simplified storage drives, including redundant storage drives. The system can use the redundant storage drives to automatically replace a defective storage drive of a given Ethernet JBOD, which allows the system to provide continuous service during a maintenance operation without requiring a service interrupt. Additionally, each simplified storage device can include multiple components (i.e., ECC codecs) to provide continuous service or access to data in case a single ECC codec fails. These multiple levels of redundancy, along with global mapping offloaded to the master nodes, can result in an improved storage system operation that provides maintenance without requiring a service interrupt.

A "distributed storage system" or a "storage system" can include multiple storage servers. A "storage server" or a "storage system" can refer to a computing device which can include multiple storage devices or storage drives. A "storage device" or a "storage drive" refers to a device or a drive with a non-volatile memory which can provide persistent storage of data, e.g., a solid state drive (SSD) or a hard disk drive (HDD). A storage system can also be a computer system. In this disclosure, a storage system or a computer system can include a plurality of master nodes and at least one collection of storage drives (e.g., a JBOD).

The term "master node" refers to a computing device which can receive an I/O request. In this disclosure, a master node can include an SSD which handles operating system boot-up and managing metadata for a plurality of collections of storage drives. An exemplary master node is described below in relation to FIG. 2.

The term "simplified storage device" refers to a storage device or drive which includes physical storage media (e.g., NAND flash) for persistent storage of data. The term "redundant simplified storage device" refers to a simplified storage device or drive which can serve as a backup for another simplified storage device or drive which is determined to be defective and/or needs to be replaced. A simplified storage device can also include a pair of ECC codecs and a pair of switches. An exemplary simplified storage device is described below in relation to FIG. 4. The terms "storage drive" and "storage device" are used interchangeably in this disclosure.

The term "ECC codec" refers to an error correction code (ECC) module which can encode or decode data based on an error correction code.

The term "JBOD" refers to just a bunch or bundle of disks. "JBOF" refers to just a bunch or bundle of flash. A JBOD or JBOF can be a collection of storage drives or storage devices.

The term "Ethernet JBOD" refers to a JBOD which can be accessed via a network or Ethernet protocol. The term "redundant Ethernet JBOD" refers to an Ethernet JBOD which can serve as a backup for another Ethernet JBOD which is determined to be defective and/or needs to be replaced. An Ethernet JBOD can include a plurality of simplified storage devices and other components. An exemplary Ethernet JBOD is described below in relation to FIG. 3.

Exemplary Operation of a Storage System in the Prior Art

Figure 1:
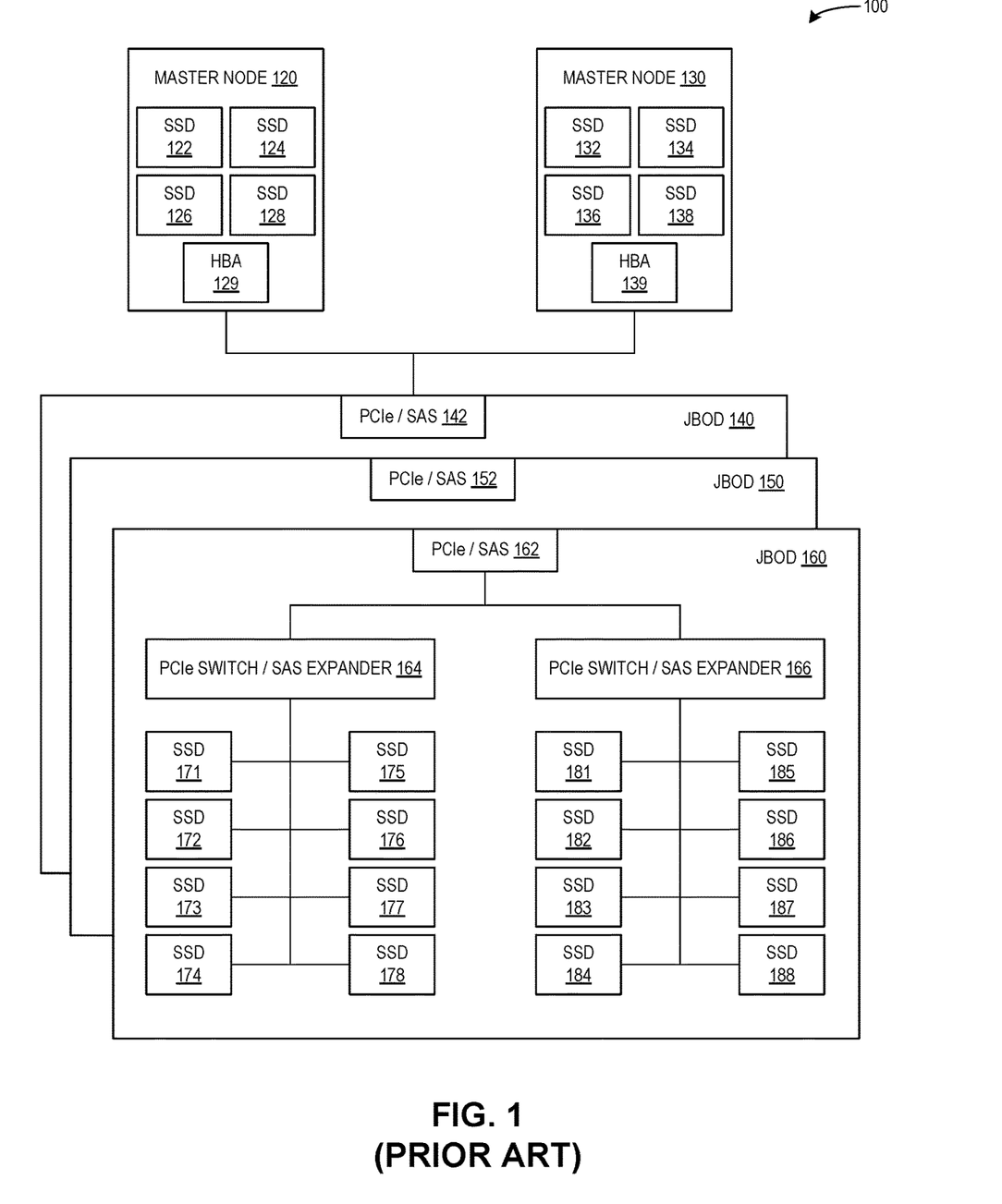
FIG. 1 illustrates an exemplary environment which facilitates operation of a storage system, in accordance with the prior art.

FIG. 1 illustrates an exemplary environment 100 which facilitates operation of a storage system, in accordance with the prior art. Environment 100 can include two master nodes (e.g., 120 and 130) and multiple JBODs (e.g., 140, 150, and 160). The master nodes can serve as dual controllers to provide high availability. If a failure occurs at one of the master nodes, the other master node can take over performing duties associated with the JBODs.

Each master node can include a host bus adaptor (HBA) and several SSDs. For example, in environment 100, master node 120 can include SSDs 122, 124, 126, and 128, as well as HBA 129, while master node 130 can include SSDs 132, 134, 136, and 138, as well as HBA 139. Each JBOD can include a PCIe/SAS interface, a PCIe switch/SAS expander, and multiple SSDs. For example, JBOD 160 can include: a PCIe/SAS interface 162; a PCIe switch/SAS expander 164 coupled to SSDs 171-178; and a PCIe switch/SAS expander 166 coupled to SSDs 181-188.

The overall system depicted in environment 100 can include hundreds of storage drives. A single storage drive in a given JBOD may fail at a certain interval, e.g., every few days. Currently, in order to fix the failed storage drive, a system operator (such as a field engineer or other human user) must replace the failed storage drive with a new storage drive, which can result in taking the entire given JBOD offline for a period of time. During this period of time, the data stored in the offline JBOD may not be accessible. A significant amount of data (e.g., several Petabytes) may be stored in the offline JBOD. Thus, during the time in which the given JBOD is offline, a service interrupt may occur which can affect customers of a service provider (of the data) in a critical manner (i.e., by not having access to this significant amount of data). Although hot/warm plugs may be enabled during the maintenance process, the risk still exists of an overall system crash during the time in which the JBOD is offline. Furthermore, even if one master node fails and the other master node is able to successfully take over, the data in the storage drives of the failed master node still cannot be accessed until the corresponding data has been recovered.

Exemplary Operation of a Storage System with Redundancy and Host-Based Mapping

The embodiments described herein provide a system which addresses the challenges described in prior art environment 100 of FIG. 1. FIG. 2 illustrates an exemplary environment 200 which facilitates operation of a storage system with redundancy, in accordance with an embodiment of the present application. Environment 200 can include multiple master nodes (220, 230, and 240) and multiple Ethernet JBODs (250, 260, 270, and 280), which are connected via a data center network 210. In contrast with the multiple SSDs included in the master nodes of prior art environment 100, in environment 200, each master node need only include a storage drive for handling booting of the operating system and the metadata (e.g., global mapping information maintained by a flash translation layer (FTL)). That is, the data which was previously stored in the SSDs of the masters nodes in environment 100 can instead be stored in the storage drives of the Ethernet JBODs of environment 200 (which storages drives are depicted below in relation to FIG. 3).

For example: master node 220 can include an SSD (OS/metadata) 222; master node 230 can include an SSD (OS/metadata) 232; and master node 240 can include an SSD (OS/metadata) 242. The system can distribute the same metadata as three replicas to the three master nodes 220, 230, and 240. If a failure occurs at one of the master nodes, the system can still access the metadata from the other two master nodes. During the time in which the failed master node is being recovered, repaired, or replaced, the system can synchronize the metadata among the three replicas.

Furthermore, JBOD 280 is depicted as a redundant JBOD. If a failure is detected at one of JBODs 250-270, the system can replace the failed JBOD with redundant JBOD 280, e.g., by reconstructing data stored in the defective JBOD based on a copy of the data stored in another JBOD (or in another plurality of storage drives). In some embodiments, if the system detects that a storage drive of one of JBODs 250-270 (e.g., JBOD 260) is defective, the system can use a storage drive from redundant JBOD 280 to replace the defective storage drive, e.g., by reconstructing data stored in the defective storage drive based on a copy of the data stored in a second storage drive. The second storage drive can also be another storage drive in the same JBOD as the defective storage drive. This allows JBOD 260 to remain online while replacing the defective storage drive of JBOD 260, as described below in relation to FIGS. 3, 5A, and 5B. Thus, by implementing the redundant Ethernet JBOD in this manner, the system can provide high availability via redundancy at the granularity of the distributed storage system itself.

Exemplary Ethernet JBOD

Figure 3:
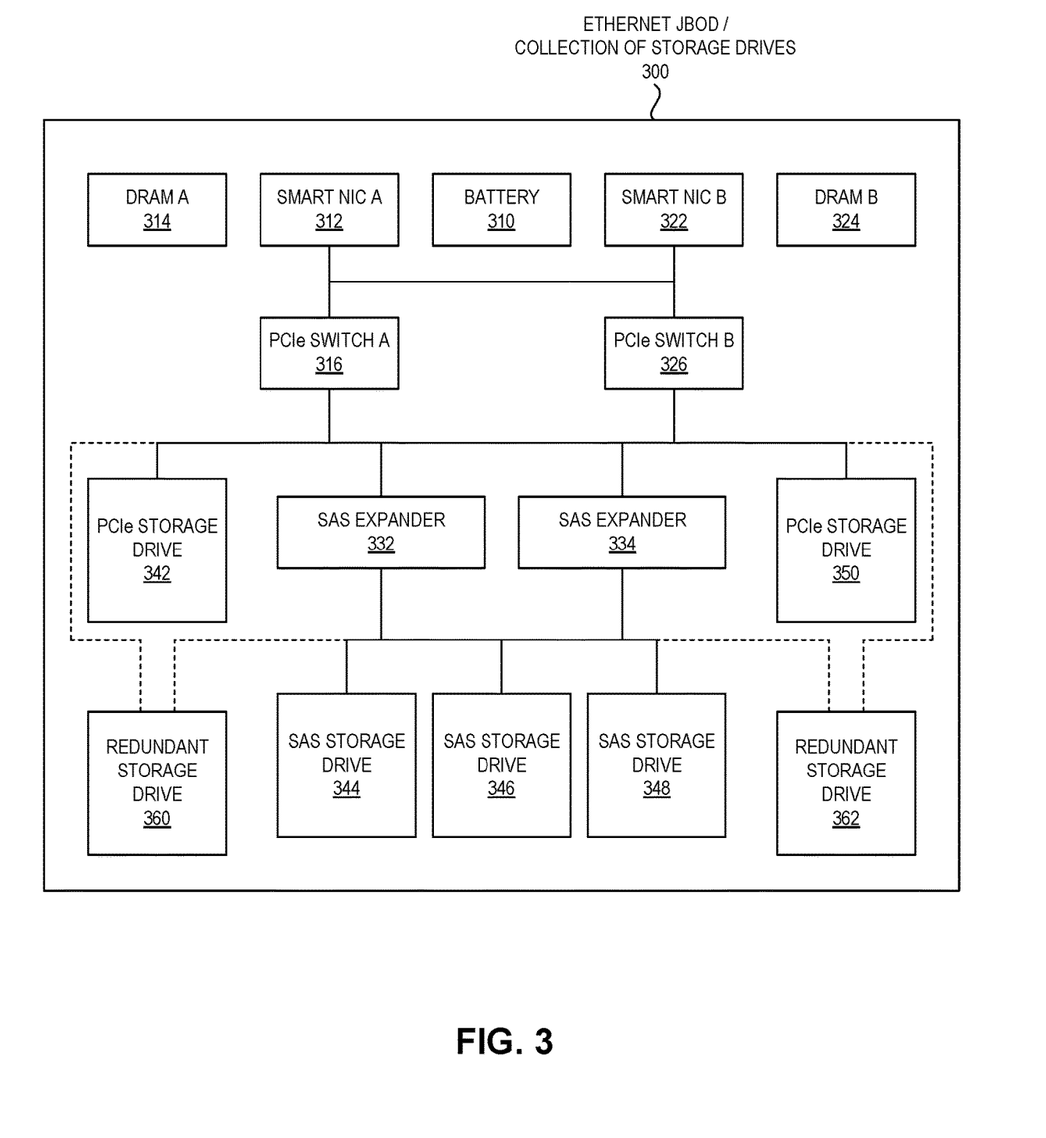
FIG. 3 depicts an exemplary Ethernet JBOD, including a battery-backed DRAM and a plurality of simplified storage devices with redundancy, in accordance with the prior art.

FIG. 3 depicts an exemplary Ethernet JBOD 300, including a battery-backed DRAM and a plurality of simplified storage devices with redundancy, in accordance with the prior art. Ethernet JBOD 300 (or a collection of storage drives) 300 can include: a battery 310; a smart NIC A 312 coupled to a PCIe switch A 316 and associated with a DRAM A 314 (i.e., a battery-backed DRAM); a smart NIC B 322 coupled to a PCIe switch B 326 and associated with a DRAM B 324 (i.e., a battery-backed DRAM); SAS expanders 332 and 334 coupled to PCIe switches A 316 and B 318; and a plurality of storage drives. The plurality of storage drives can include: PCIe storage drives 342 and 350 (coupled to PCIe switches A and B 316 and 326); SAS storage drives 344, 346, and 348 (coupled to SAS expanders 332 and 334); and redundant storage drives 360 and 362. Redundant storage drives 360 and 362 can be coupled to PCIe switches A 316 and B 326 and/or coupled to SAS expanders 332 and 334, as depicted by the dashed lines. That is, redundant storage drives 360 and 362 can be, e.g., a PCIe storage drive and/or an SAS storage drive. In some embodiments, redundant storage drives 360 and 362 can be any storage drive which can be accessed via or coupled to a component (such as a switch), which component is coupled to a NIC.

As depicted in FIG. 3, Ethernet JBOD 300 includes components which are designed with dual partners (e.g., in pairs) to ensure high availability. For example, each NIC is associated with its own volatile memory for use as system memory and a data buffer. Smart NIC A 312 is associated with DRAM A 314, while smart NIC B 322 is associated with DRAM B 324. If the system detects an error associated with smart NIC A 312, DRAM A 314, and/or PCIe switch A 316, the system can access the storage drives of JBOD 300 via smart NIC B 322, DRAM B 324, and PCIe switch B 326 (and vice versa).

Battery 310 can be used to provide a transient charge for moving data from the volatile memory (e.g., DRAM A 314 and DRAM B 324) to the non-volatile memory (e.g., NAND flash) of storage drives 342-350. Each of storage drives 342-350 can store the data in its NAND flash, and each of storage drives 342-350 can be a simplified SSD which, unlike a conventional SSD, does not include FTL mapping or OS boot-up functionality. That is, storage drives 342-350 may be considered simplified SSDs because the FTL mapping is offloaded to the master nodes (e.g., to master nodes 220-240 depicted in FIG. 2 and their respective SSDs 222-242 (for OS/metadata functionality)). An exemplary "simplified" storage drive (such as storage drives 342-350) is described below in relation to FIG. 4.

During operation, the system can detect that one of storage drives 342, 344, 346, 348, and 350 is defective. In response to detecting the defective storage drive, the system can replace the defective storage drive with one of the redundant storage drives 360 and 362 in JBOD 300. This allows the system to perform on-the-fly and automatic maintenance on a defective storage drive, i.e., without having to take the entirety of Ethernet JBOD 300 offline in order to replace a single defective storage drive.

By including redundant "simplified" storage drives into an Ethernet-capable JBOD, offloading the mapping functionality to a plurality of master nodes, and including redundancy at the JBOD and the storage drive levels, the embodiments described herein can result in an improved system which can provide on-the-fly maintenance (e.g., repair or replacement) of defective storage drives without resulting in a service interrupt. Thus, the data stored in the many other storage drives of this high-capacity JBOD can remain accessible even when a single storage drive is found to be defective and/or the data stored in the defective storage drive can no longer be accessed. That is, the system can provide high availability via redundancy at the granularity of the entire Ethernet JBOD itself.

Exemplary Simplified Storage Device

Figure 4:
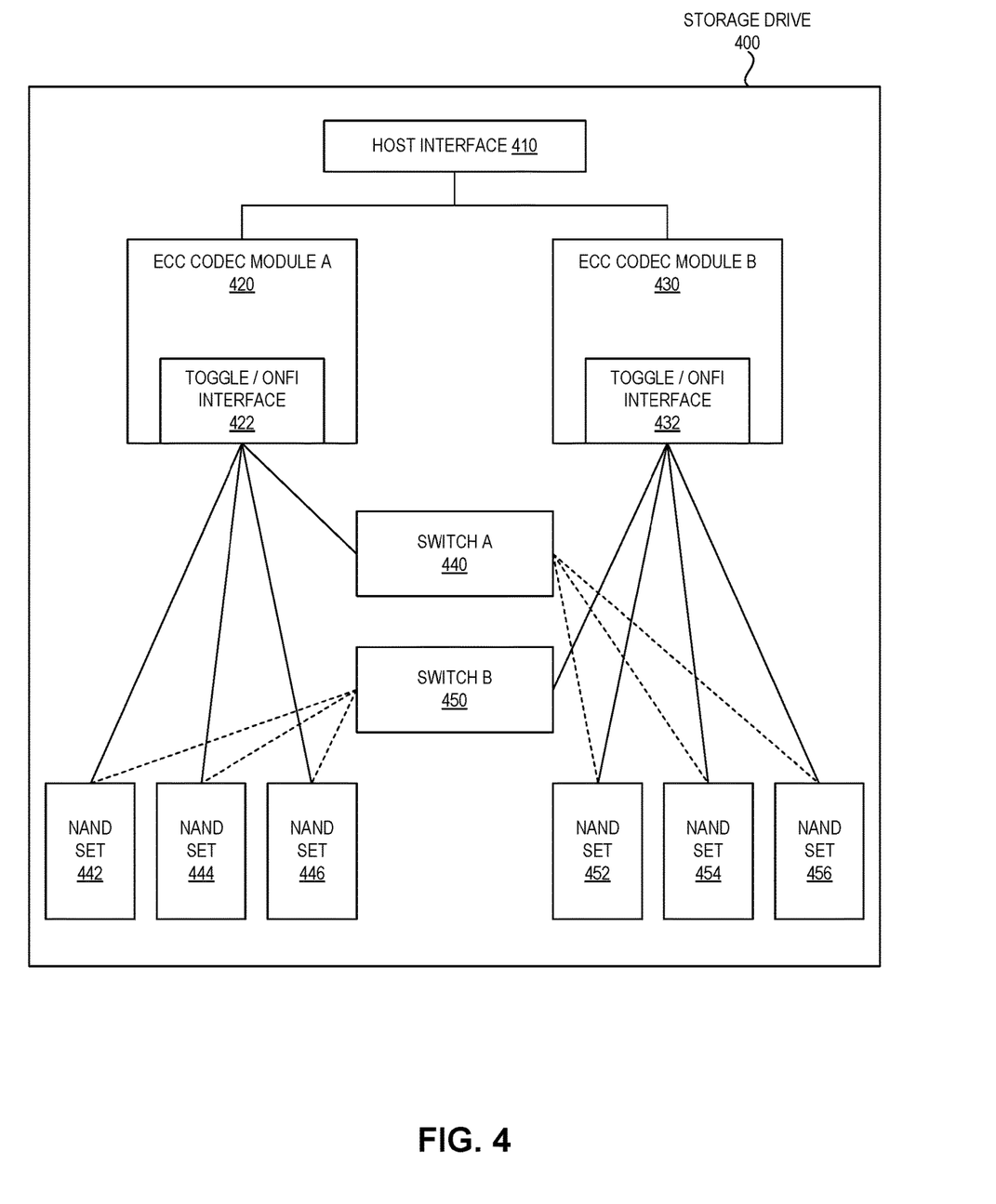
FIG. 4 depicts an exemplary simplified storage device, including a pair of ECC codecs and a pair of switches, in accordance with an embodiment of the present application.

FIG. 4 depicts an exemplary simplified storage device 400, including a pair of ECC codecs and a pair of switches, in accordance with an embodiment of the present application. Storage device 400 can include: a host interface 410; an ECC codec module A 420 with a toggle/Open NAND Flash (ONFI) interface 422; an ECC codec module B 430 with a toggle/ONFI interface 432; a switch A 440; a switch B 450; and NAND sets 442, 444, 446, 452, 454, and 456. Host interface 410 can be, e.g., a PCIe or SAS interface. Each ECC codec module can be coupled to a switch and a plurality of NAND sets, such that if one ECC codec encounters a failure (e.g., in ECC encoding or other failure), the other ECC codec can resume control of the plurality of NAND sets (coupled to the failed ECC codec) via the other switch.

For example, ECC codec module A 420 can be coupled to switch A 440 and a first plurality of NAND sets 442, 444, and 446, while ECC codec module B 430 can be coupled to switch B 450 and a second plurality of NAND sets 452, 454, and 456 (as indicated by the solid lines). If an error or failure occurs associated with encoding data in ECC codec module A 420, the system can access the first plurality of NAND sets 442, 444, and 446 via switch B 450 (as indicated by the dashed lines). Similarly, if an error or failure occurs associated with encoding data in ECC codec module B 430, the system can access the second plurality of NAND sets 452, 454, and 456 via switch A 440 (as indicated by the dashed lines).

Thus, by implementing two paths via which data may travel for processing and storage (e.g., two sets in which each ECC module is coupled to a pair of switches and a first plurality of NAND memory), the system can provide high availability via redundancy at the granularity of the respective storage drive itself.

Method for Facilitating Operation of a Storage System

Figure 5A:
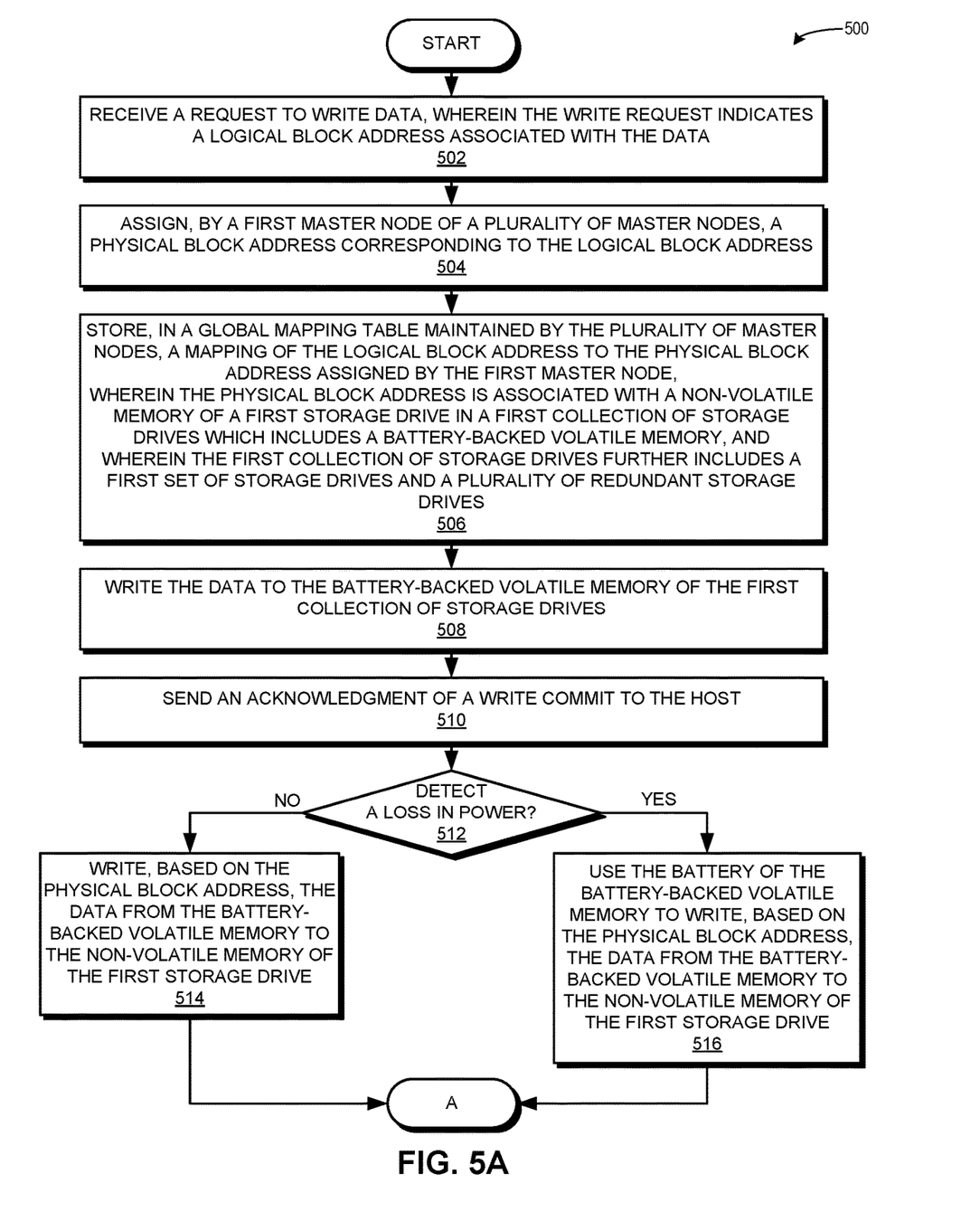
FIG. 5A presents a flowchart illustrating a method for facilitating operation of a storage system, including a write operation, in accordance with an embodiment of the present application.

FIG. 5A presents a flowchart 500 illustrating a method for facilitating operation of a storage system, including a write operation, in accordance with an embodiment of the present application. During operation, the system receives a request to write data, wherein the write request indicates a logical block address associated with the data (operation 502). The system assigns, by a first master node of a plurality of master nodes, a physical block address corresponding to the logical block address (operation 504). The system stores, in a global mapping table maintained by the plurality of master nodes, a mapping of the logical block address to the physical block address assigned by the first master node, wherein the physical block address is associated with a non-volatile memory of a first storage drive in a first collection of storage drives which includes a battery-backed volatile memory, and wherein the first collection of storage drives further includes a first set of storage drives and a plurality of redundant storage drives (operation 506).

The system writes the data to the battery-backed volatile memory of the first collection of storage drives (operation 508). The system sends an acknowledgment of a write commit to the host (operation 510). If the system does not detect a power loss (decision 512), the system writes, based on the physical block address, the data from the battery-backed volatile memory to the non-volatile memory of the first storage drive (operation 514). If the system does detect a power loss (decision 512), the system uses the battery of the battery-backed volatile memory to write, based on the physical block address, the data from the battery-backed volatile memory to the non-volatile memory of the first storage drive (operation 516). The operation continues at Label A of FIG. 5B.

Figure 5B:
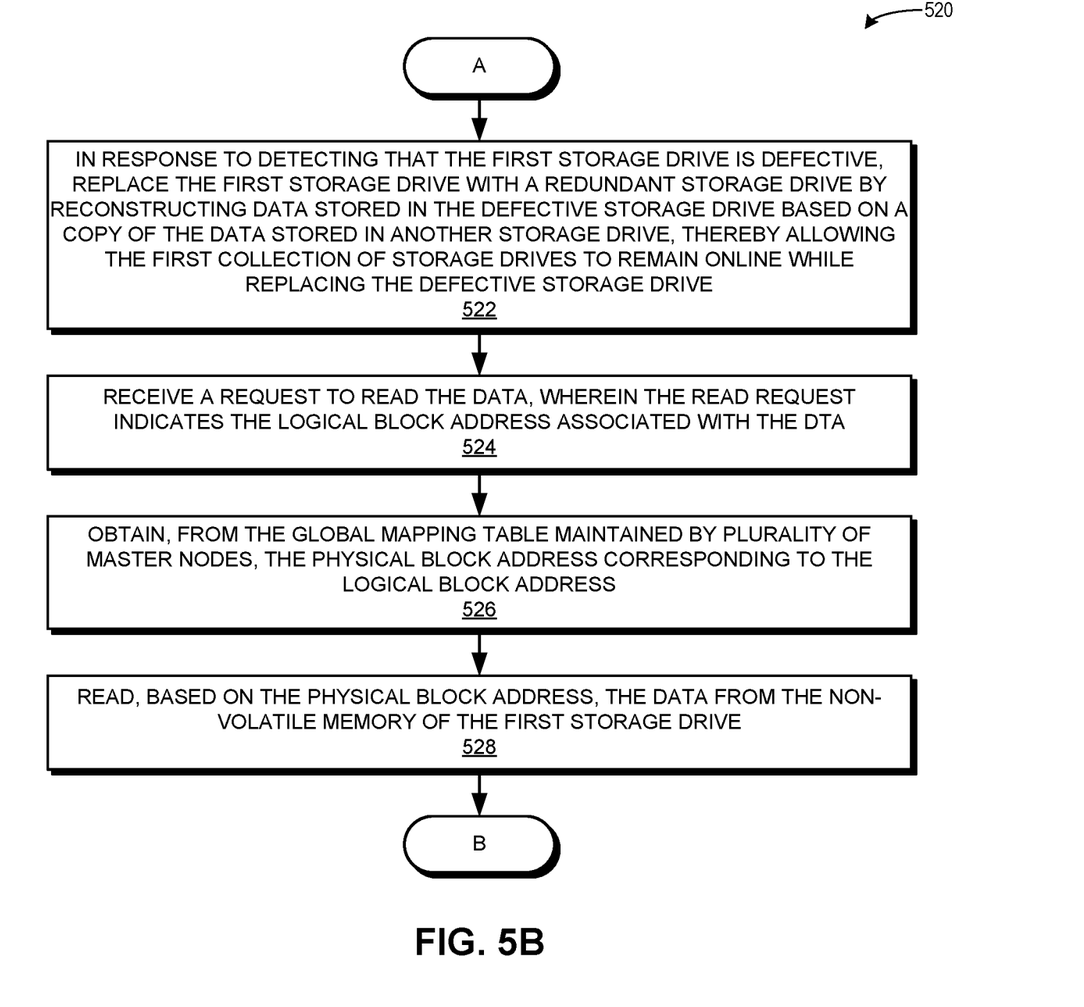
FIG. 5B presents a flowchart illustrating a method for facilitating operation of a storage system, including a read operation, in accordance with an embodiment of the present application.

FIG. 5B presents a flowchart illustrating a method for facilitating operation of a storage system, including a read operation, in accordance with an embodiment of the present application. In response to detecting that the first storage drive is defective, the system replaces the first storage drive with a redundant storage drive by reconstructing data stored in the defective storage drive based on a copy of the data stored in another storage drive, thereby allowing the first collection of storage drives to remain online while replacing the defective storage drive (operation 522). That is, when the first storage drive is found to be defective, rather than removing the storage drive and taking the entire first collection of drives offline (as described above in the conventional system in relation to FIG. 1), the system can automatically begin to use the redundant storage drive, such that the first collection of storage drives can remain online (and its data remains accessible) while the defective drive is being repaired.

The system receives a request to read the data, wherein the read request indicates the logical block address associated with the data (operation 524). The system obtains, from the global mapping table, the physical block address corresponding to the logical block address (operation 526). The system reads, based on the physical block address, the data from the non-volatile memory of the first storage drive (operation 528). The operation continues at Label B of FIG. 5C.

FIG. 5C presents a flowchart 540 illustrating a method for facilitating operation of a storage system, including several redundancy mechanisms, in accordance with an embodiment of the present application. The write request (of operation 502) is received by a distributed storage system, which comprises the plurality of master nodes and a plurality of collections of storage drives, including the first collection of storage drives and a redundant collection of storage drives. A flash translation layer module in each master node maintains and stores the global mapping table. In response to detecting that the first collection of storage drives is defective, the system replaces the first collection of storage drives with the redundant collection of storage drives, which involves reconstructing data stored in the defective collection of storage drives based on a copy of the data stored in another collection of storage drives (operation 542). This allows data stored in the first collection of storage drives to remain accessible while replacing the first collection of storage drives.

The first collection of storage drives comprises: a battery; the battery-backed volatile memory, which comprises a first volatile memory and a second volatile memory; a first network interface card (NIC) coupled to a first switch and associated with the first volatile memory; a second NIC coupled to a second switch and associated with the second volatile memory; the first set of storage drives; and the plurality of redundant storage drives. In response to detecting an error associated with the first NIC, the first volatile memory, and the first switch, the system accesses the storage drives of the first collection via the second NIC, the second volatile memory, and the second switch (operation 544). The first switch and the second switch can be coupled to a plurality of expanders. The first set of storage drives can include at least one second storage device coupled to the first or second switch and at least one third storage device coupled to the expanders.

A respective storage drive comprises: a first and a second ECC module; a first and a second switch; and a first and a second plurality of sets of flash memory (such as NAND flash). The first ECC module is coupled to the first switch and the first plurality of sets of flash memory, and the second ECC module is coupled to the second switch and the second plurality of sets of flash memory. The system encodes, by the first and the second ECC modules, based on the ECC, data to be written to the first and the second plurality of sets of flash memory (operation 546). In response to detecting a failure associated with encoding data based on the ECC in the first or the second ECC module, the system accesses the first or the second plurality of sets of flash memory via the second or the first switch (i.e., the other switch) (operation 548) (e.g., as described above in relation to FIG. 4).

Exemplary Computer System and Apparatus

Figure 6:
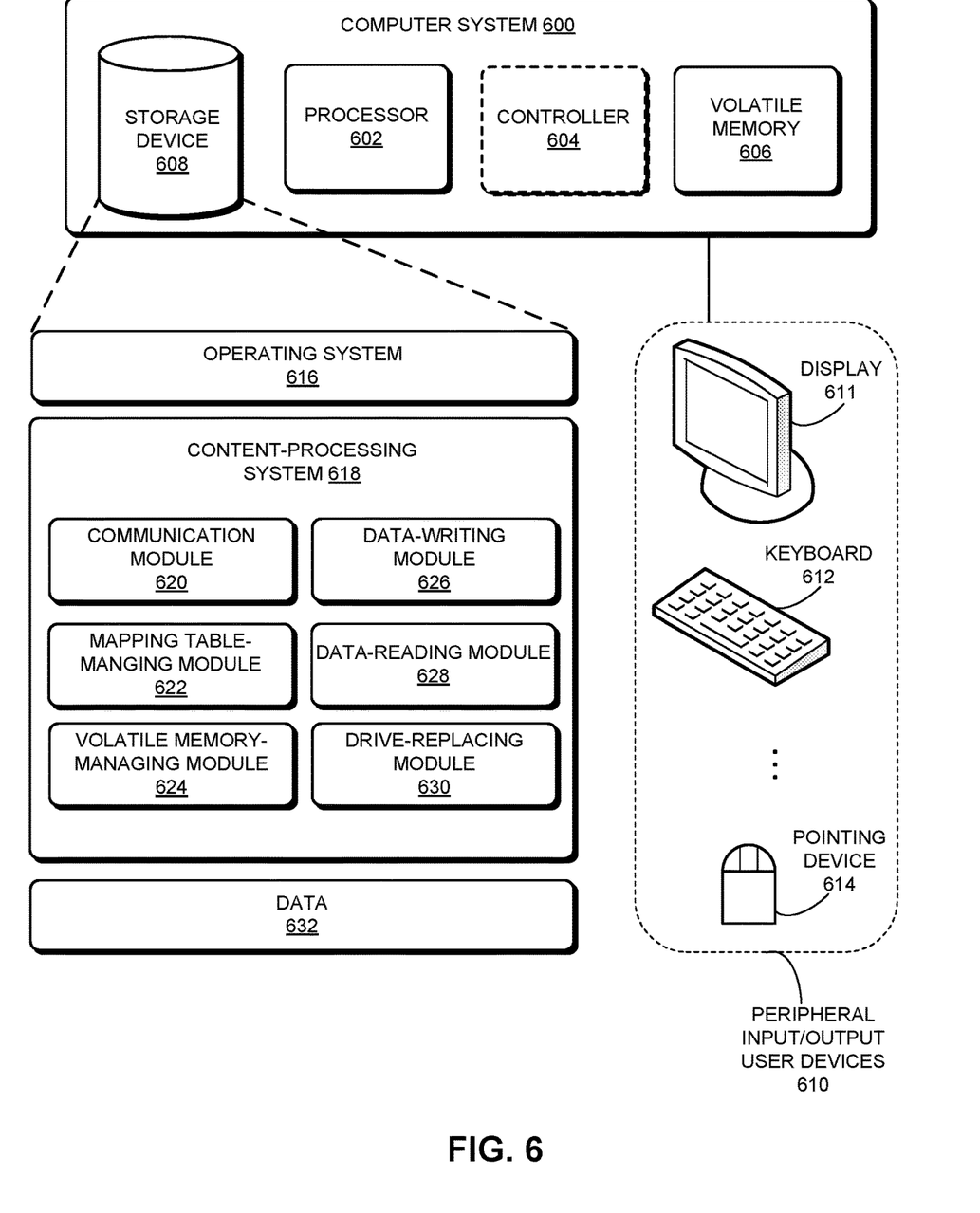
FIG. 6 illustrates an exemplary computer system that facilitates operation of a storage system, in accordance with an embodiment of the present application.

FIG. 6 illustrates an exemplary computer system 600 that facilitates operation of a storage system, in accordance with an embodiment of the present application. Computer system 600 includes a processor 602, a volatile memory 606, and a storage device 608. In some embodiments, computer system 600 can include a controller 604 (indicated by the dashed lines). Volatile memory 606 can include, e.g., random access memory (RAM), that serves as a managed memory, and can be used to store one or more memory pools. Storage device 608 can include persistent storage which can be managed or accessed via processor 602 (or controller 604). Furthermore, computer system 600 can be coupled to peripheral input/output (I/O) user devices 610, e.g., a display device 611, a keyboard 612, and a pointing device 614. Storage device 608 can store an operating system 616, a content-processing system 618, and data 632.

Content-processing system 618 can include instructions, which when executed by computer system 600, can cause computer system 600 or processor 602 to perform methods and/or processes described in this disclosure. Specifically, content-processing system 618 can include instructions for receiving and transmitting data packets, including data to be read or written and an input/output (I/O) request (e.g., a read request or a write request) (communication module 1020).

Content-processing system 618 can further include instructions for receiving a request to write data, wherein the write request indicates a logical block address associated with the data (communication module 620). Content-processing system 618 can include instructions for storing, in a global mapping table maintained by a plurality of master nodes, a mapping of the logical block address to a physical block address assigned by a master node, wherein the physical block address is associated with a non-volatile memory of a first storage drive in a first collection of storage drives which includes a battery-backed volatile memory, and wherein the first collection of storage drives further includes a first set of storage drives and a plurality of redundant storage drives (mapping table-managing module 622). The communication module 620 and/or the mapping table-managing module 622 may reside in a master node in a content-processing system separate from content-processing system 618 of computer system 600 (e.g., as depicted in FIG. 2).

Content-processing system 618 can additionally include instructions for writing the data to the battery-backed volatile memory (volatile memory-managing module 624). Content-processing system 618 can include instructions for writing, based on the physical block address, the data from the battery-backed volatile memory to the non-volatile memory of the first storage drive (data-writing module 626). Content-processing system 618 can further include instructions for, in response to detecting that the first storage drive is defective, replacing the first storage drive with a redundant storage drive by reconstructing data stored in the defective storage drive based on a copy of the data stored in another storage drive, thereby allowing the first collection of storage drives to remain online while replacing the defective storage drive (drive-replacing module 630).

Content-processing system 618 can also include instructions for receiving a request to read the data, wherein the read request indicates the logical block address associated with the data (communication module 620). Content-processing system 618 can include instructions for obtaining, from the global mapping table, the physical block address corresponding to the logical block address (mapping table-managing module 622). Content-processing system 618 can include instructions for reading, based on the physical block address, the data from the non-volatile memory of the first storage drive (data-reading module 628).

Data 632 can include any data that is required as input or generated as output by the methods and/or processes described in this disclosure. Specifically, data 632 can store at least: data; a request; a read request; a write request; an input/output (I/O) request; data associated with a read request, a write request, or an I/O request; a logical block address (LBA); a physical block address (PBA); a mapping of an LBA to a PBA; an indicator of a storage drive in a collection of storage drives; an indicator of a collection of storage drives; an indicator of a defective storage drive; a replica of data; a reconstructed copy of data; an indicator of a battery-backed volatile memory, a NIC, a switch, or a set of storage drives; an identifier of a PCIe switch, an SAS expander, a PCIe storage drive, or an SAS storage device; an error correction code; an ECC codec module; an indicator of a set of flash memory; an indicator of a failure associated with a NIC, a volatile memory, a switch, or encoding data based on an ECC; an indicator of a detected power loss; an indicator or identifier of a master node; a global mapping table; and an entry in the global mapping table which maps an LBA to a PBA.

Figure 7:
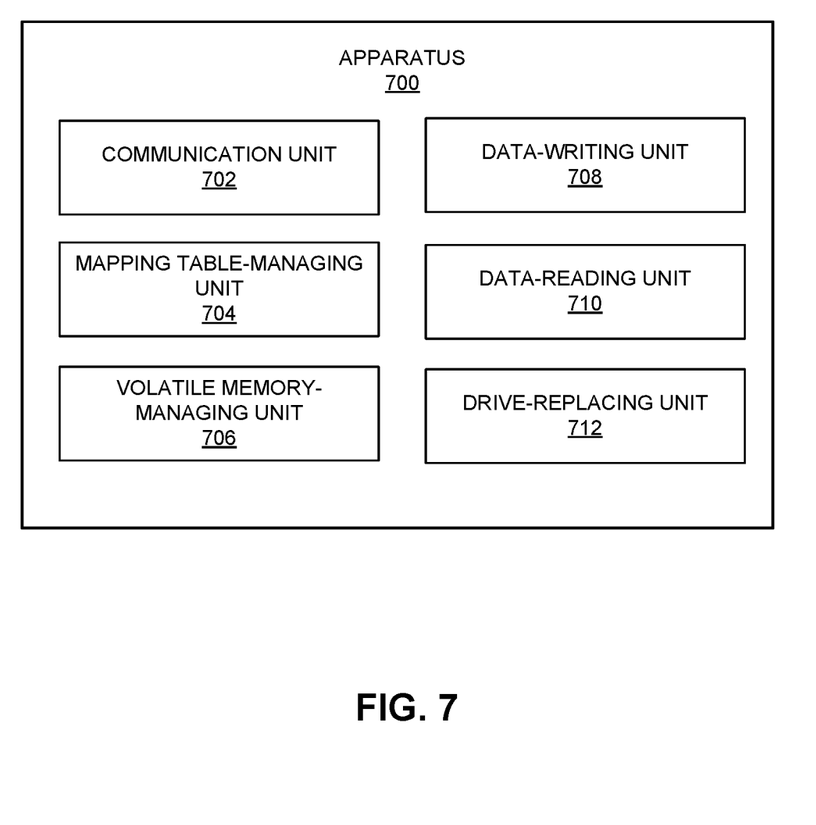
FIG. 7 illustrates an exemplary apparatus that facilitates operation of a storage system, in accordance with an embodiment of the present application.

FIG. 7 illustrates an exemplary apparatus 700 that facilitates operation of a storage system, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device or devices capable of communicating with other computer systems and/or devices. Specifically, apparatus 700 can comprise modules or units 702-710 which are configured to perform functions or operations similar to modules 620-630 of computer system 600 of FIG. 6, including: a communication unit 702; a mapping table-managing unit 704; a volatile memory-managing unit 706; a data-writing unit 708; a data-reading unit 710; and a drive-replacing unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
  receiving a request to write data, wherein the write request indicates a logical block address associated with the data;
  storing, in a global mapping table maintained by a plurality of master nodes, a mapping of the logical block address to a physical block address assigned by a master node, wherein the physical block address is associated with a non-volatile memory of a first storage drive in a first collection of storage drives, and wherein the first collection of storage drives includes a first set of storage drives and a plurality of redundant storage drives;
  writing, based on the physical block address, the data to the non-volatile memory of the first storage drive; and
  in response to detecting that the first storage drive is defective, replacing the first storage drive with a redundant storage drive by reconstructing data stored in the defective storage drive based on a copy of the data stored in another storage drive.

2. The method of claim 1, wherein the write request is received by a distributed storage system, which comprises:
  the plurality of master nodes, wherein a flash translation layer module in each master node maintains and stores the global mapping table; and a plurality of collections of storage drives, including the first collection of storage drives and a redundant collection of storage drives.

3. The method of claim 2, wherein in response to detecting that the first collection of storage drives is defective, the method comprises:
replacing the first collection of storage drives with the redundant collection of storage drives, which involves reconstructing data stored in the defective collection of storage drives based on a copy of the data stored in another collection of storage drives,
thereby allowing data stored in the first collection of storage drives to remain accessible while replacing the first collection of storage drives.

4. The method of claim 1, wherein the first collection of storage drives comprises:
a battery;
a battery-backed volatile memory, which comprises a first volatile memory and a second volatile memory;
a first network interface card (NIC) coupled to a first switch and associated with the first volatile memory;
a second NIC coupled to a second switch and associated with the second volatile memory, wherein the first switch and the second switch are coupled to a plurality of expanders;
the first set of storage drives, including at least one second storage device coupled to the first or second switch and at least one third storage device coupled to the expanders; and
the plurality of redundant storage drives.

5. The method of claim 4,
wherein the first switch or the second switch is a Peripheral Component Interconnect Express (PCIe) switch,
wherein the expanders are Serial Attached SCSI (SAS) expanders,
wherein the second storage device is a PCIe storage device, and
wherein the third storage device is an SAS storage device.

6. The method of claim 4, wherein in response to detecting an error associated with the first NIC, the first volatile memory, and the first switch, the method further comprises:
accessing the storage drives of the first collection via the second NIC, the second volatile memory, and the second switch.

7. The method of claim 1, wherein a respective storage drive comprises:
a first error correction code (ECC) module and a second ECC module;
a first switch and a second switch; and
a first plurality of sets of flash memory and a second plurality of sets of flash memory,
wherein the first ECC module is coupled to the first switch and the first plurality of sets of flash memory, and
wherein the second ECC module is coupled to the second switch and the second plurality of sets of flash memory.

8. The method of claim 7, further comprising:
encoding, by the first and the second ECC modules based on the ECC, data to be written to the first and the second plurality of sets of flash memory; and
in response to detecting a failure associated with encoding data based on the ECC in the first or the second ECC module, accessing the first or the second plurality of sets of flash memory via the second or the first switch.

9. The method of claim 1, wherein the first collection of storage drives further includes a battery-backed volatile memory, and wherein the method further comprises:

prior to writing the data to the non-volatile memory of the first storage drive, writing the data to the battery-backed volatile memory;
wherein writing the data to the non-volatile memory of the first storage drive comprises writing, based on the physical address, the data from the battery-backed volatile memory to the non-volatile memory of the first storage drive; and
in response to detecting a power loss, using the battery of the battery-backed volatile memory to write the data from the battery backed volatile memory to the non-volatile memory of the first storage drive.

10. The method of claim 1, further comprising:
receiving a request to read the data, wherein the read request indicates the logical block address associated with the data;
obtaining, from the global mapping table, the physical block address corresponding to the logical block address; and
reading, based on the physical block address, the data from the non-volatile memory of the first storage drive.

11. A computer system, comprising:
a plurality of master nodes, wherein a respective master node comprises a first processor and a first memory coupled to the first processor and storing instructions which, when executed by the first processor cause the first processor to perform a first method; and
a first collection of storage drives, which includes a first set of storage drives and a plurality of redundant storage drives, wherein the first collection of storage drives comprises a second processor and a second memory coupled to the second processor and storing instructions which, when executed by the second processor, cause the second processor to perform a second method;
wherein the first method comprises:
receiving a request to write data, wherein the write request indicates a logical block address associated with the data; and
storing, in a global mapping table maintained by the plurality of master nodes, a mapping of the logical block address to a physical block address assigned by a master node, wherein the physical block address is associated with a non-volatile memory of a first storage drive in the first collection of storage drives; and
wherein the second method comprises:
writing, based on the physical block address, the data to the non-volatile memory of the first storage drive; and
in response to detecting that the first storage drive is defective, replacing the first storage drive with a redundant storage drive by reconstructing data stored in the defective storage drive based on a copy of the data stored in another storage drive.

12. The computer system of claim 11,
wherein a flash translation layer module in each master node maintains and stores the global mapping table; and
wherein the storage system further comprises a plurality of collections of storage drives, including the first collection of storage drives and a redundant collection of storage drives.

13. The computer system of claim 12, wherein in response to detecting that the first collection of storage drives is defective, the second method further comprises:

replacing the first collection of storage drives with the redundant collection of storage drives, which involves reconstructing data stored in the defective collection of storage drives based on a copy of the data stored in another collection of storage drives, thereby allowing data stored in the first collection of storage drives to remain accessible while replacing the first collection of storage drives.

14. The computer system of claim 11, wherein the first collection of storage drives comprises:
a battery;
a battery-backed volatile memory, which comprises a first volatile memory and a second volatile memory;
a first network interface card (NIC) coupled to a first switch and associated with the first volatile memory;
a second NIC coupled to a second switch and associated with the second volatile memory, wherein the first switch and the second switch are coupled to a plurality of expanders;
the first set of storage drives, including at least one second storage device coupled to the first or second switch and at least one third storage device coupled to the expanders; and
the plurality of redundant storage drives.

15. The computer system of claim 14, wherein in response to detecting an error associated with the first NIC, the first volatile memory, and the first switch, the second method further comprises:
accessing the storage drives of the first collection via the second NIC, the second volatile memory, and the second switch.

16. The computer system of claim 11, wherein a respective storage drive comprises:
a first error correction code (ECC) module and a second ECC module;
a first switch and a second switch; and
a first plurality of sets of flash memory and a second plurality of sets of flash memory,
wherein the first ECC module is coupled to the first switch and the first plurality of sets of flash memory, and
wherein the second ECC module is coupled to the second switch and the second plurality of sets of flash memory.

17. The computer system of claim 16,
wherein the first and the second ECC modules are configured to encode, by the first and the second ECC modules based on the ECC, data to be written to the first and the second plurality of sets of flash memory; and
wherein in response to detecting a failure associated with encoding data based on the ECC in the first or the second ECC module, the respective storage drive is configured to access the first or the second plurality of sets of flash memory via the second or the first switch.

18. The computer system of claim 11, wherein the first collection of storage drives further includes a battery-backed volatile memory, and wherein the first method further comprises:

prior to writing the data to the non-volatile memory of the first storage drive, writing the data to the battery-backed volatile memory;

wherein writing the data to the non-volatile memory of the first storage drive comprises writing, based on the physical address, the data from the battery-backed volatile memory to the non-volatile memory of the first storage drive; and in response to detecting a power loss, using the battery of the battery-backed volatile memory to write the data from the battery backed volatile memory to the non-volatile memory of the first storage drive.

19. An apparatus, comprising:
a plurality of master nodes; and
at least one collection of storage drives, which includes a first set of storage drives and a plurality of redundant storage drives,
wherein a respective master node comprises:
a communication module configured to receive a request to write data, wherein the write request indicates a logical block address associated with the data; and
a mapping table-managing module configured to store, in a global mapping table maintained by the plurality of master nodes, a mapping of the logical block address to a physical block address assigned by a master node, wherein the physical block address is associated with a non-volatile memory of a first storage drive in the first collection of storage drives; and
wherein the at least one collection of storage drives comprises:
a data-writing module configured to write, based on the physical block address, the data to the non-volatile memory of the first storage drive; and
a drive-replacing module configured to, in response to detecting that the first storage drive is defective, replace the first storage drive with a redundant storage drive by reconstructing data stored in the defective storage drive based on a copy of the data stored in another storage drive.

20. The apparatus of claim 19,
wherein the communication module is further configured to receive a request to read the data, wherein the read request indicates the logical block address associated with the data;
wherein the mapping table-managing module is further configured to obtain, from the global mapping table, the physical block address corresponding to the logical block address; and
wherein the at least one collection of storage drives further comprises a data-reading module configured to read, based on the physical block address, the data from the non-volatile memory of the first storage drive.

* * * * *